(12) United States Patent
Nakahara (10) Patent No.: US 7,830,415 B2
(45) Date of Patent: Nov. 9, 2010

(54) CAMERA HAVING AN IMAGE STABILIZER

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 578 days.

(21) Appl. No.: 11/877,757

(22) Filed: Oct. 24, 2007

(65) Prior Publication Data

US 2008/0180536 A1 Jul. 31, 2008

(30) Foreign Application Priority Data

Oct. 27, 2006 (JP) ............................. 2006-291897

(51) Int. Cl.
*H04N 5/228* (2006.01)
(52) U.S. Cl. .............................. 348/208.99; 348/222.1; 348/345
(58) Field of Classification Search ............ 348/208.99, 348/208.1–208.12, 222.1, 345
See application file for complete search history.

(56) References Cited

U.S. PATENT DOCUMENTS

| | | | |
|---|---|---|---|
| 2003/0053536 A1* | 3/2003 | Ebrami | 348/148 |
| 2006/0077280 A1 | 4/2006 | Nakahara | |
| 2006/0078323 A1 | 4/2006 | Nakahara | |
| 2006/0238621 A1* | 10/2006 | Okubo et al. | 348/208.99 |
| 2007/0122133 A1* | 5/2007 | Shiratori | 396/55 |
| 2007/0127138 A1 | 6/2007 | Nakahara | |

| | | |
|---|---|---|
| 2007/0140676 A1 | 6/2007 | Nakahara |

FOREIGN PATENT DOCUMENTS

| | | |
|---|---|---|
| JP | 8-87047 | 4/1996 |
| JP | 2002-311325 | 10/2002 |

OTHER PUBLICATIONS

U.S. Appl. No. 11/847,554 to Nakahara, which was filed on Aug. 30, 2007.
English language Abstract of JP 8-87047.
English language Abstract of JP 2002-311325.

* cited by examiner

*Primary Examiner*—Gevell Selby
(74) *Attorney, Agent, or Firm*—Greenblum & Bernstein, P.L.C.

(57) ABSTRACT

A camera having an image stabilizer includes a focus adjusting system which captures images at different positions along an optical axis of a focusing lens group of a photographing optical system via an image pickup device while performing a searching operation in which the focusing lens group detects an in-focus position based on contrasts of the captured images; a vibration detector for detecting camera shake; a shake-reduction driving device which is driven to prevent an object image formed on the image pickup device from shaking relative thereto when the vibration detector detects camera shake; and a controller which controls the focus adjusting system so as to one of suspend and terminate the searching operation one of when the vibration detector detects the camera shake during the searching operation and when the camera shake lasts for more than a predetermined period of time during the searching operation.

14 Claims, 6 Drawing Sheets

CAMERA HAVING AN IMAGE STABILIZER

BACKGROUND OF THE INVENTION

1. Field of the Invention

The present invention relates to a camera having an image stabilizer.

2. Description of the Related Art

Conventionally, so-called compact digital cameras are generally provided with a contrast-detection focus detection system which detects a focus state by performing an searching operation (scanning operation) in which a focusing lens group is moved from the closest (shortest) focus position (near extremity/position for bringing an object at the shortest distance in working range into focus) to the infinite focus position (far extremity/position for bringing an object at infinity into focus), or vice versa (see Japanese Unexamined Patent Publication 2002-311325). In this type of compact digital camera, various cameras which incorporate an image stabilizer (shake reduction system/anti-shake system/camera-shake correction system) with an image-stabilizing optical element have been developed (see Japanese Unexamined Patent Publication H08-087047).

However, in such conventional compact digital cameras, when the user of the camera or the camera itself severely moves during a focusing operation, a main object tends to deviate from an AF (autofocus) frame and therefore a correct in-focus position cannot be obtained, which makes it impossible to bring the main object into focus or may bring an object other than the main object into focus in error.

SUMMARY OF THE INVENTION

The present invention has been devised in view of the above described problem which arises in conventional compact digital cameras, and provides a camera with an image stabilizer which makes it possible to achieve an in-focus state with precision even when the camera severely moves during a focusing operation.

According to an aspect of the present invention, a camera having an image stabilizer is provided, including a focus adjusting system which captures images at different positions along an optical axis of a focusing lens group of a photographing optical system via an image pickup device while performing a searching operation in which the focusing lens group is moved along the optical axis thereof to detect an in-focus position of the focusing lens group based on contrasts of the captured images; a vibration detector for detecting camera shake; a shake-reduction driving device which is driven in a manner to prevent an object image which is formed on the image pickup device via the photographing optical system from shaking relative to the image pickup device when the vibration detector detects the camera shake; and a controller which controls the focus adjusting system so as to one of suspend and terminate the searching operation one of when the vibration detector detects a larger amount of the camera shake than a predetermined magnitude during the searching operation and when the camera shake lasts for more than a predetermined period of time during the searching operation.

It is desirable for the controller to control the focusing adjusting system so as to move the focusing lens group back to the search start extremity when the controller makes the focus adjusting system terminate the searching operation.

Upon the controller controlling the focusing adjusting system so as to suspend the searching operation, it is desirable for the controller to resume the searching operation immediately after the vibration detector detects that a magnitude of the camera shake has become smaller than that at the suspension of the searching operation. When the controller controls the focusing adjusting system so as to terminate the searching operation, the controller resets and restarts the searching operation immediately after the vibration detector detects that the magnitude of the camera shake is smaller than that at the termination of the searching operation.

Upon the controller controlling the focusing adjusting system so as to suspend the searching operation, it is desirable for the controller to resume the searching operation immediately after the vibration detector detects that the camera shake abates. When the controller controls the focusing adjusting system so as to terminate the searching operation, the controller resets and restarts the searching operation immediately after the vibration detector detects that the camera shake abates.

Upon the controller controlling the focusing adjusting system so as to suspend the searching operation, it is desirable for the controller to resume the searching operation immediately after a lapse of a predetermined period of time. When the controller controls the focusing adjusting system so as to terminate the searching operation, the controller resets and restarts the searching operation immediately after the lapse of the predetermined period of time.

Upon the controller controlling the focusing adjusting system so as to suspend the searching operation, it is desirable for the controller to resume the searching operation one of when the vibration detector detects that one of the camera shake abates and a magnitude of the camera shake becomes smaller than a predetermined magnitude at the suspension of the searching operation, and when a predetermined period of time elapses, whichever occurs earlier. Upon the controller controlling the focusing adjusting system so as to terminate the searching operation, the controller resets and restarts the searching operation one of when the vibration detector detects that one of the camera shake abates and that a magnitude of the camera shake becomes smaller than the predetermined magnitude at the termination of the searching operation, and when the predetermined period of time elapses, whichever occurs earlier.

It is desirable for the controller to prohibit the focusing adjusting system from suspending the searching operation regardless of the camera shake after restarting the searching operation subsequent to the suspension of the searching operation, and for the controller to prohibits the focusing adjusting system from terminating the searching operation regardless of the camera shake after resetting and restarting the searching operation subsequent to the termination of the searching operation.

It is desirable for the controller to limit the number of executions of the suspension of the searching operation to a predetermined number. The controller prohibits the focusing adjusting system from suspending the searching operation regardless of the camera shake after restarting the searching operation subsequent to the suspension of the searching operation. The controller prohibits the focusing adjusting system from terminating the searching operation regardless of the camera shake after resetting and restarting the searching operation subsequent to the termination of the searching operation.

It is desirable for the magnitude of the camera shake at each of the suspension of the searching operation and the termination of the searching operation to be one of equal to and greater than a predetermined magnitude determined in accordance with a current focal length of the photographing optical system.

It is desirable for the magnitude of the camera shake at each of the suspension of the searching operation and the termination of the searching operation to be set to be smaller as a focal length of the photographing optical system increases.

It is desirable for the controller to prohibit the focusing adjusting system from either suspending or terminating the searching operation regardless of the camera shake if the scanning operation is performed over at least a predetermined scanning range.

It is desirable for the camera to be a digital camera, and for the shake-reduction driving device to move the image pickup device in directions orthogonal to an optical axis to prevent the object image from shaking relative to the image pickup device.

It is desirable for the camera to include a switch for turning ON and OFF the shake-reduction driving device, wherein the controller activates the vibration detector and the shake-reduction driving device regardless of an ON/OFF state of the switch when the focus adjusting system starts the searching operation.

It is desirable for the vibration detector to include two angular velocity sensors.

According to the present invention, the possibility of a main object becoming out of focus or an object other than the main object being brought into focus in error can be prevented because the searching operation is suspended or terminated upon the vibration detector detecting camera shake.

Since the controller terminates the searching operation and makes the focusing adjusting system move the focusing lens group back to the search start extremity when the vibration detector detects camera shake during the searching operation, it is possible to perform the searching operation over again in a short time.

In the case where the searching operation is restarted upon a lapse of a predetermined period of time from the time the focusing lens group is moved back to the search start extremity after the termination of the searching operation, the searching operation can be restarted without delay even when the user of the camera himself/herself severely vibrates while, e.g., riding on a means of transport such as a train. Moreover, in the case where the searching operation is restarted when camera shake abates, the searching operation can be restarted without delay after composition adjustment even when the user of the camera makes a slight adjustment to composition. In either case, a camera-shake correcting operation is performed, and accordingly, a precise focusing operation can be carried out.

If the present invention is applied to a camera with the switch device for turning ON and OFF the shake-reduction driving device, the shake-reduction driving device is turned ON when the searching operation is performed even when the switch device is OFF, which reduces the effects of camera shake, thus making a precise searching operation possible.

The present disclosure relates to subject matter contained in Japanese Patent Application No. 2006-291897 (filed on Oct. 27, 2006) which is expressly incorporated herein in its entirety.

BRIEF DESCRIPTION OF THE DRAWINGS

The present invention will be discussed below in detail with reference to the accompanying drawings, in which:

FIGS. 3A and 3B are diagrammatic sketches for illustrating the relationship between the AF frame (focusing area) and a main object image in a picture area of the compact digital camera, wherein FIG. 3A shows a state where the main object image is positioned inside of the AF frame and FIG. 3B shows a state where the main object image is positioned outside of the AF frame;

FIGS. 4A, 4B, 4C and 4D illustrated an AF search process performed in a contrast AF process shown in FIG. 6, wherein FIG. 4C shows a manner of movement of the focusing lens group in the AF search process when no camera shake is detected, and FIG. 4D shows a manner of movement of the focusing lens group in the AF search process in the AF search process when camera shake is detected;

FIG. 5 is a flow chart showing a main process performed upon the power of the compact digital camera being turned ON;

DESCRIPTION OF THE PREFERRED EMBODIMENT

Figure 1:
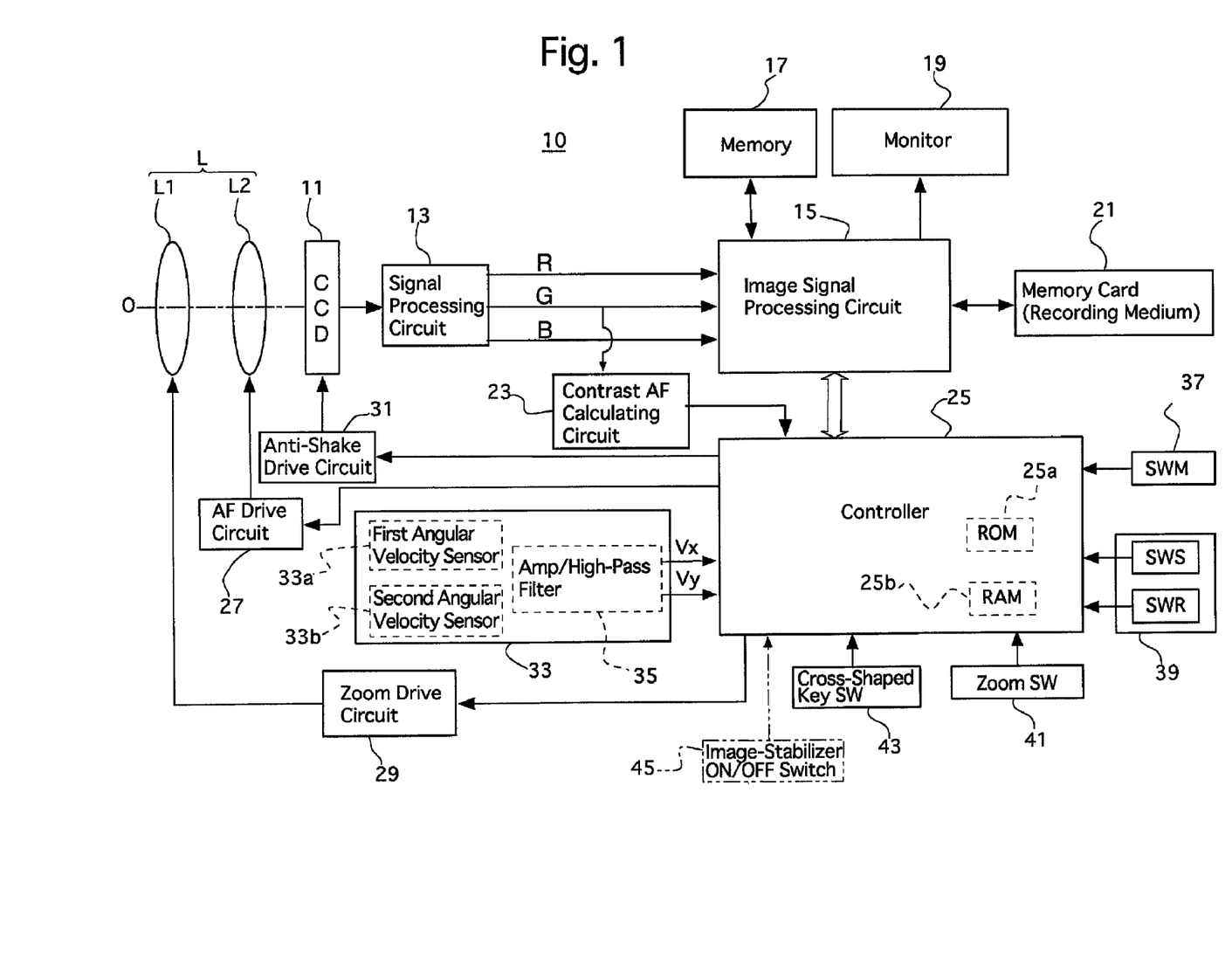
FIG. 1 is a block diagram showing main components of an embodiment of a compact digital camera according to the present invention.
Figure 2:
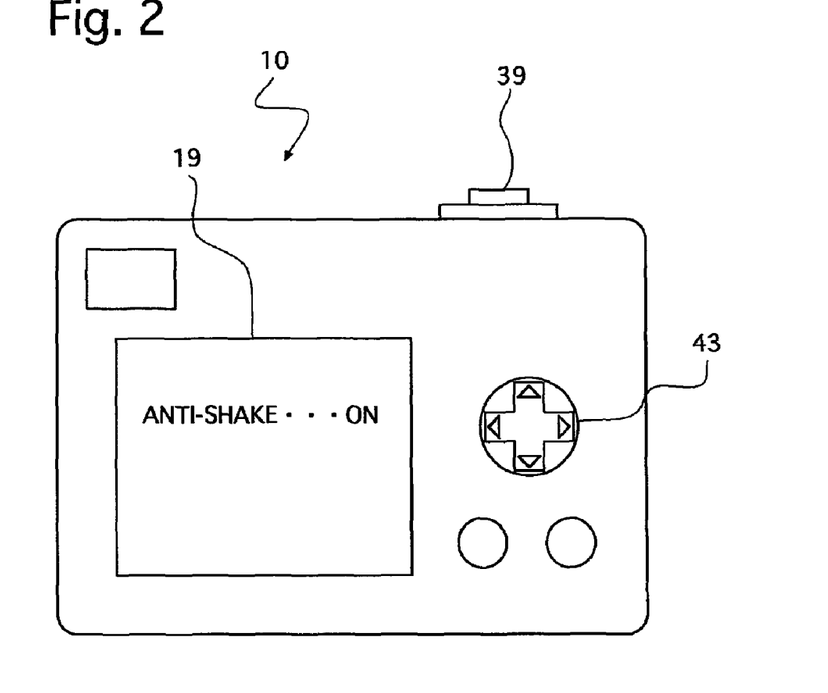
FIG. 2 is a rear elevational view of the compact digital camera.

FIG. 1 is a block diagram showing main components of an embodiment of a compact digital camera 10 which includes an image stabilizer (camera-shake correction device/shake reduction device) and a contrast AF type of focus adjusting system, according to the present invention, and FIG. 2 is a rear elevational view of the compact digital camera 10.

In the compact digital camera 10, an object image is formed on the light receiving surface (imaging surface) of a CCD image sensor (image pickup device/an image-stabilizing optical element) 11 by a zoom lens system (photographing optical system) L including a zoom lens group L1 and a focusing lens group L2. The zoom lens group L1 contributes mainly to the zooming operation of the compact digital camera 10 and the focusing lens group L2 contributes mainly to the focus adjustment operation of the digital camera 10. The image pickup device 11 includes a large number of pixels (photoelectric transducing elements) on each of which a primary color filter is positioned. An object image received by the image pickup device 11 at a time of exposure is converted into electric charge by each pixel of the image pickup device 11, and this electric charge is accumulated (integrated). Upon completion of an exposure, this accumulated electric charge is output, pixel by pixel, as an image signal to a signal processing circuit 13. The signal processing circuit 13 amplifies the input image signal, performs predetermined adjusting processes such as a white-balance adjusting process and an A/D converting process on the input image signal, and outputs digital RGB (red/green/blue) image data to an image signal processing circuit 15 and a contrast AF calculating circuit 23.

The image signal processing circuit 15 performs a known image signal processing process on the input digital RGB image signal to write this processed image signal (image data) into a cash memory 17, visually indicates the same processed image signal on a monitor 19, and writes the same processed image signal into a memory card 21 serving as a recording medium. Such operations performed by the image signal processing circuit 15 are controlled by a controller (CPU) 25.

In a contrast AF process (see FIG. 6), the contrast AF calculating circuit 23 inputs the digital RGB image signal of an image in an AF (autofocus) frame (left and right square brackets) 53 (which indicates a focus area; see FIGS. 3A and 3B) to calculate contrast of this image, and outputs contrast data to the controller 25. The controller 25 performs an AF search process (AF scan process). In the AF search process, the controller 25 repeats a process of calculating contrast based on contrast data of the object image input from the contrast AF calculating circuit 23 while moving the focusing lens group L2 stepwise within a predetermined movable range thereof via an AF drive circuit 27, and writing the contrast thus calculated into a built-in RAM 25b. The AF drive circuit 27 includes an AF motor (not shown) for driving the focusing lens group L2. Thereafter, upon completion of the AF search process, a position of the focusing lens group L2 at which a peak contrast is obtained is calculated based on contrasts obtained at predetermined intervals from the closest focus position to the infinite focus position of the focusing lens group L2, and moves the focusing lens group L2 to the position of the focusing lens group L2 thus calculated, which completes the contrast AF process.

The controller 25 starts operating upon a main switch 37 being turned ON, performs the above described contrast AF process upon a photometering SWS being turned ON, and writes an image signal of an image captured by the CCD image sensor 11 into the memory card 21 upon a release switch SWR being turned ON. The photometering SWS and the release switch SWR are turned ON when a release button 39 is half and fully depressed, respectively.

The digital camera 10 is further provided with an angular velocity sensing device (vibration detector) 33 serving as a vibration detector for detecting vibrations (camera shake), tilting and panning movements of the camera body of the digital camera 10. The angular velocity sensing device 33 is provided with a first angular velocity sensor 33a and a second angular velocity sensor 33b. With the camera body being held in the normal position, the first angular velocity sensor 33a senses vibrations of an optical axis O of the zoom lens system L in the lateral (horizontal) direction in a horizontal plane and the second angular velocity sensor 33b senses vibrations of the optical axis O of the zoom lens system L in the longitudinal (vertical) direction in a vertical plane. An amp/high-pass filter 35 amplifies the input detection signals, that are output from the first angular velocity sensor 33a and the second angular velocity sensor 33b, and outputs the amplified detection signals as shake detection signals Vx and Vy to the controller 25 after removing low-frequency components therefrom. By removing low-frequency components from the amplified detection signals that are output to the controller 25, the controller 25 can correct image blur caused by hand shake by the amplified detection signals, and tiling or panning can be detected when the user of the digital camera 10 follows a moving main object.

Based on the input shake detection signals Vx and Vy and the current focal length of the zoom lens system L, the controller 25 calculates the direction and the speed of movement of the CCD image sensor 11 which are necessary to prevent an object image formed on the CCD image sensor 11 from moving relative to the CCD image sensor 11 (i.e., necessary to make the CCD image sensor 11 move together with this object image), and moves the CCD image sensor 11 via an anti-shake driving circuit (shake-reduction driving device) 31. Note that the current focal length of the zoom lens system L is detected by a known zoom-code detecting device (not shown) which detects the position of the zoom lens group L1 to detect the current focal length. Although the CCD image sensor 11 constitutes a correcting element of the image stabilizer in the digital camera 10, the correcting element is not limited solely to the CCD image sensor 11; an optical element in the zoom lens system L can be driven in directions orthogonal to the optical axis O of the zoom lens system L to serve as the correcting element.

The controller 25 drives the zoom lens group L1 via a zoom driving circuit 29 to perform a zooming operation upon a zoom switch 41 being operated. Additionally, the controller 25 sets various mode settings and the like such as an exposure mode and a recording mode upon a multi-way control switch 43 being operated, and also turns ON and OFF an image stabilizing operation (camera-shake correcting operation) upon the multi-way control switch 43 being operated. The digital camera 10 can further be provided with an image-stabilizer ON/OFF switch 45 separately from the multi-way control switch 43 so that the image stabilizing operation is turned ON and OFF alternately each time the image-stabilizer ON/OFF switch 45 is operated.

Figure 3A:
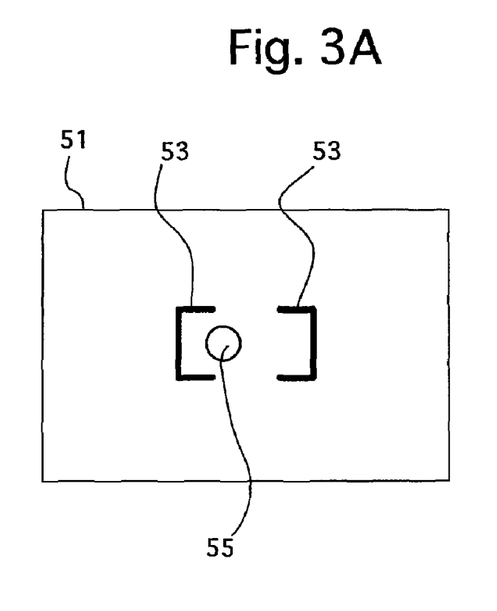
Figure 3B:
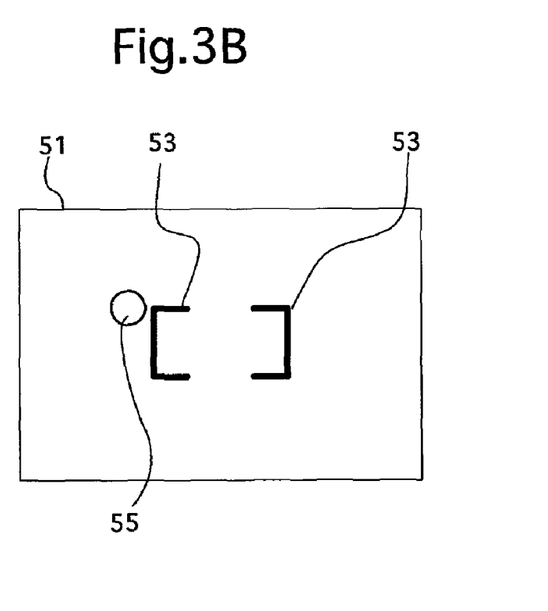
Figure 4A:
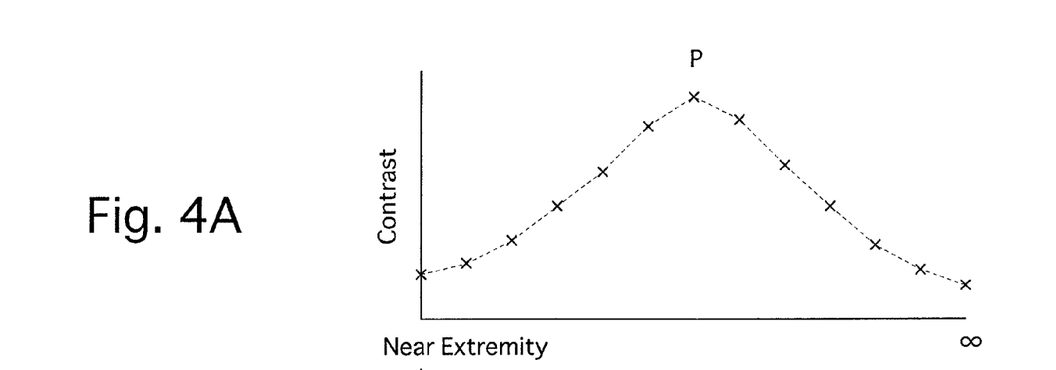
FIG. 4A shows a relationship between the position of the focusing lens group and the contrast of an object image when no camera shake occurs during the AF search process.
Figure 4B:
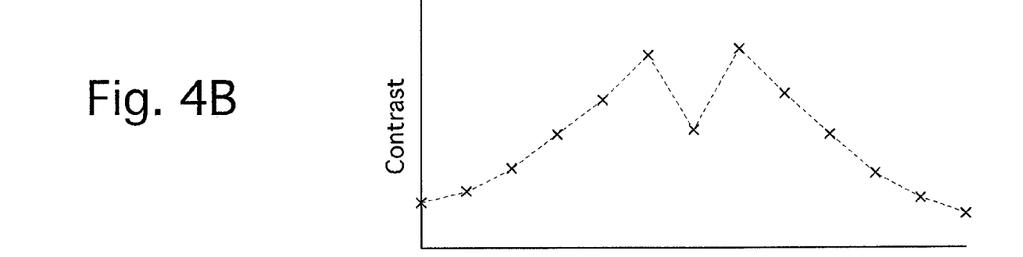
FIG. 4B shows a relationship between the position of the focusing lens group and the contrast of an object image when camera shake occurs during the AF search process.
Figure 4C:
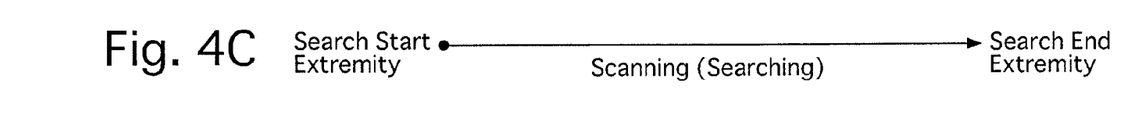
Figure 4D:
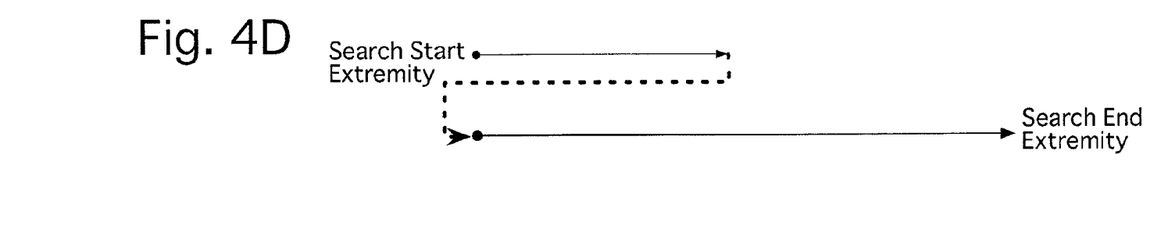

FIG. 3A shows a state where a main object image 55 is positioned inside of the AF frame 53, and FIG. 3B shows a state where the main object image 55 is outside of the AF frame 53 due to camera shake. FIG. 4A shows a relationship between the position of the focusing lens group L2 and the contrast of an object image when no camera shake occurs during the AF search process, and FIG. 4B shows a relationship between the position of the focusing lens group L2 and the contrast of an object image when camera shake occurs during the AF search process. FIG. 4C shows a manner of movement of the focusing lens group L2 in the AF search process when no camera shake is detected, and FIG. 4D shows a manner of movement of the focusing lens group L2 in the AF search process when camera shake is detected.

The digital camera 10 is composed so that the main object image 55 is positioned inside of the AF frame 53 (see FIG. 3A). Thereafter, the controller 25 starts the AF search process upon the release button 39 being depressed half way (upon the photometering switch SWS being turned ON). In the AF search process in the present embodiment of the compact digital camera 10, the controller 25 moves the focusing lens group L2 to the search start extremity (closest focus position) thereof via the AF drive circuit 27, performs an image capturing process on the image pickup device 11, inputs pixel signals of an image in the AF frame 41 to determine the contrast value on this image, and repeats these operations while moving the focusing lens group L2 stepwise via the AF drive circuit 27 toward the search end extremity (infinite focus position) from the search start extremity until the focusing lens group L2 reaches the search end extremity (see FIG. 4C). In this process, if the main object image 55 remains within the AF frame 53 during a searching operation (AF searching operation) from the search start extremity to the search end extremity, a peak contrast P is obtained as shown in FIG. 4A. The position of the focusing lens group L2 at which this peak contrast P is obtained is an in-focus position of the focusing lens group L2 at which focus is achieved on the main object image 55.

However, if the main object image 55 deviates from the AF frame 53 due to camera shake during the searching operation, in which the focusing lens group L2 is moved from the closest focus position to the infinite focus position to obtain a peak contrast, there is a possibility of a contrast of an object image other than the main object image 55 being measured. For instance, if the main object image 55 deviates from the AF frame 53 due to camera shake during the searching operation when the focusing lens group L2 is positioned in the vicinity of a position thereof at which a peak contrast is to be obtained, contrast of an object image other than the main object image 55 may be measured, so that a peak contrast may not be obtained. For this reason, the peak contrast P, which may be obtained if the main object image 55 remains within the AF frame 53 as shown in FIG. 3A, may not be obtained; a peak contrast may not be detected to thereby fall into a state in which focus cannot be achieved; or a peak contrast of an object image other than the main object image 55 may be detected to thereby bring this minor object image into focus in error (see FIG. 4B).

To prevent this problem from occurring, in the present embodiment of the compact digital camera 10, the AF search process is terminated upon the controller 25 detecting that camera shake continues more than a predetermined period of time. Thereafter, the controller 25 moves the focusing lens group L2 back to the search start extremity (closest focus position) thereof (i.e., the AF searching operation is reset), either waits a predetermined period of time or waits for camera shake to abate (to an insignificant degree), and restarts the AF search process either when the predetermined period of time elapses or when the camera shake abates, whichever occurs earlier.

In an alternative embodiment of the compact digital camera 10, the controller 25 suspends the AF search process upon detecting camera shake. Subsequently, the controller 25 resumes the AF search process from this suspended state if the camera shake abates within a predetermined period of time. If the camera shake does not abate within this predetermined period of time, the controller 25 moves the focusing lens group L2 back to the search start extremity (closest focus position) thereof, either waits another predetermined period of time or waits for the camera shake to abate, and restarts the AF search process either when the predetermined period of time elapses or when the camera shake abates, whichever occurs earlier.

Figure 5:
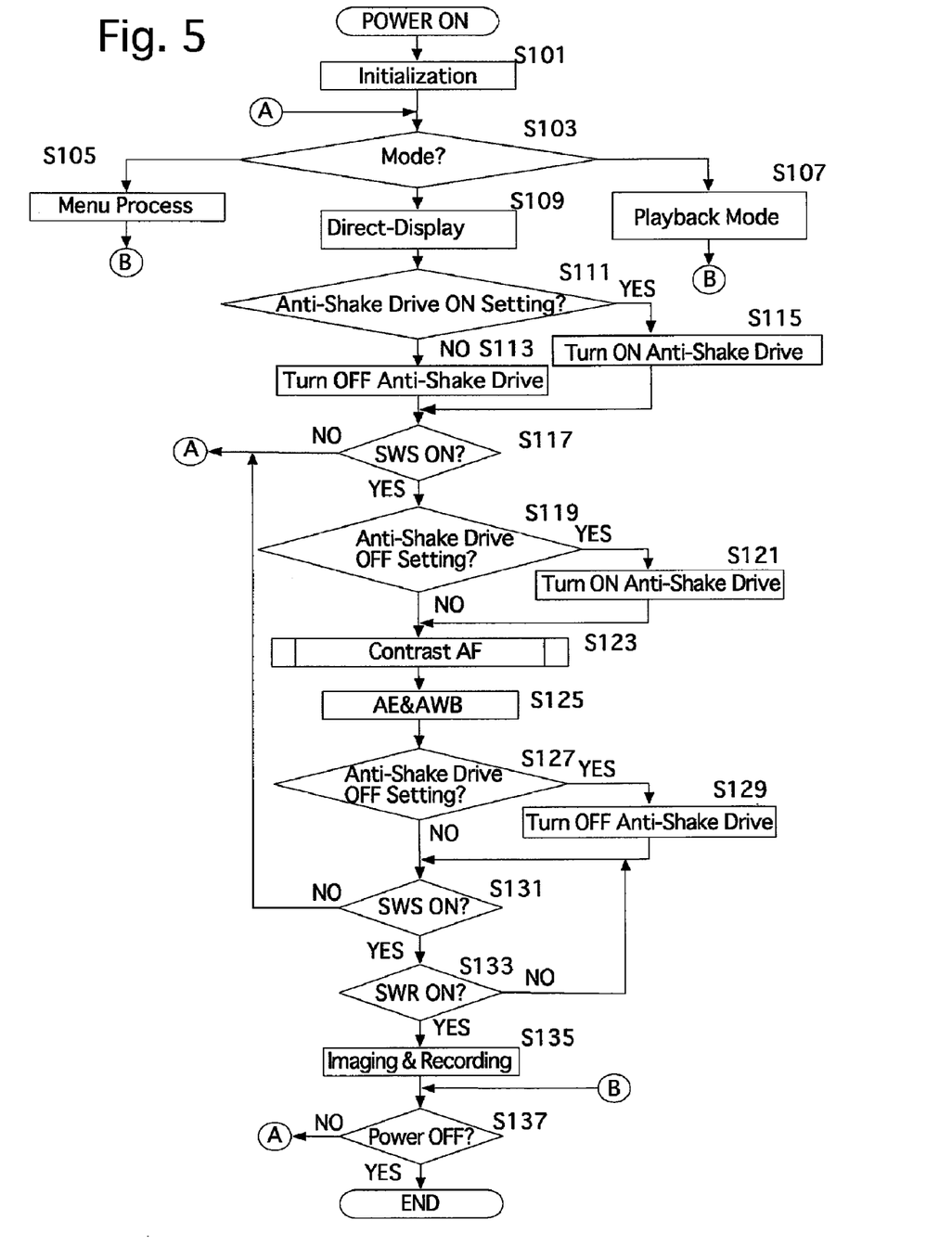

Operations of the contrast AF operation performed in the present embodiment of the compact digital camera 10 will be discussed in detail with reference to the flow charts shown in FIGS. 5 through 8. FIG. 5 is a flow chart showing a main process (main sequence of operations). The controller 25 reads a program written in a ROM 25a of the controller 25 therefrom and runs this program upon the power of the compact digital camera 10 being turned ON by an operation of the main switch 37.

In the main process, firstly hardware and software such as the built-in RAM 25b, ports and variables are initialized (step S101). Subsequently, it is determined whether or not a menu mode is currently selected, whether or not an image capturing mode (imaging mode) is currently selected, and whether or not a playback mode is currently selected (step S103). In this particular embodiment, the default mode is the image capturing mode. A menu process (step S105) or a playback mode (step S107) is selected in accordance with the operation of the multi-way control switch 43.

If the menu process is selected, a menu is displayed on a monitor 19 to allow configuration of an image-stabilization ON/OFF setting and selection of various mode settings such as a recording mode, and control proceeds to step S137 upon a terminating operation is performed. If the playback mode is selected, image data written in the memory card 21 is read in to display the image of this image data on the monitor 19, and control proceeds to step S137 upon a terminating operation is performed. As described above, in this embodiment of the compact digital camera 10, the ON/OFF control action of an anti-shake, i.e., camera shake correction can be set with the multi-way control switch 43.

In the case of the image capturing mode, operations at and after step S109 are performed. At step S109, a direct-display process) for indicating images which are captured by the CCD image sensor 11 at regular intervals on the monitor 19 is started.

Subsequently, it is determined whether or not the digital camera is on an anti-shake drive ON setting (step S111). If it is determined that the digital camera is not on the anti-shake ON setting (if NO at step S111), an anti-shake drive OFF process is performed (S113). If it is determined that the digital camera is on the anti-shake ON setting (if YES at step S111), an anti-shake drive ON process is performed (S115). In the anti-shake drive ON process, the angular velocity sensing device 33 is activated, and the CCD image sensor 11 is driven in a plane orthogonal to the optical axis O of the zoom lens system L in a manner to prevent image shake, i.e., to prevent an object image which is formed on the imaging surface of the CCD image sensor 11 from shaking thereon. In the anti-shake drive OFF process, a process of moving the CCD image sensor 11 back to the initial position there of is performed. The initial position of the CCD image sensor 11 is the position at which the center of the imaging surface of the CCD image sensor 11 is coincident with the optical axis O of the zoom lens system L.

Thereafter, it is determined whether or not the photometering switch SWS is ON (step S117). If the photometering switch SWS is not ON (if NO at step S117), control returns to step S103.

If the photometering switch SWS is ON (if YES at step S117), it is determined whether or not the digital camera 10 is on the anti-shake OFF setting (step S119). If the digital camera 10 is on the anti-shake OFF setting (if YES at step S119), the anti-shake drive ON process is performed (step S121) and control proceeds to step S123. If the digital camera 10 is not on the anti-shake OFF setting (if NO at step S119), control simply proceeds to step S123. In other words, the anti-shake drive is turned ON so that the CCD image sensor 11 is driven so as to counteract the effects of camera shake during the AF search process to thereby make a precise focus detection process possible.

At step S123 the contrast AF process (see FIG. 6) is performed. In the contrast AF process, a peak contrast of the main object image 55 positioned in the AF frame 53 is searched, and the focusing lens group L2 is moved to a position at which this peak contrast is obtained to bring the main object into focus.

Upon completion of the contrast AF process, an AE process for setting a correct shutter speed and a correct f-number and an auto white balance (AWB) process for making an adjustment to the white balance are performed based on the image signal of an image captured in an in-focused state (step S125).

Subsequently, it is determined whether or not the digital camera 10 is on the anti-shake OFF setting (step S127). If the digital camera 10 is not on the anti-shake OFF setting (if NO at step S127), control simply proceeds to step S131. If the digital camera 10 is on the anti-shake OFF setting (if YES at step S127), the anti-shake drive OFF process is performed (step S129) and control proceeds to step S131. In the anti-shake drive OFF process, the CCD image sensor 11 is moved back to the initial position thereof and the anti-shake driving circuit 31 is turned OFF. If the digital camera 10 is on the anti-shake ON setting when control enters step S127, the anti-shake drive continues, i.e., the CCD image sensor 11 continues to be driven.

It is determined at step S131 whether or not the photometering switch SWS is ON. If the photometering switch SWS is not ON (if NO at step S131), control returns to step S103. If the photometering switch SWS is ON (if YES at step S131), it is determined whether or not the release switch SWR is ON (step S133). If the release switch SWR is not ON (if NO at step S133), control returns to step S131. Upon the release switch SWR being turned ON (if YES at step S133), an image capturing process in which an imaging capturing operation is performed with the shutter speed and the f-number which are obtained at step S125 and a signal correcting process in which the image signal of the captured object image is corrected with the white balance adjusted at step 125 are performed, and a recording process in which the image signal thus corrected is written into the memory card 21 in a preset recording format is performed (step S135). Thereafter, it is determined whether or not the main switch 37 is OFF (step S137). If the main switch 37 is not OFF (if ON at step S137), control returns to step S103. If the main switch 37 is OFF (if YES at step S137), the main process shown in FIG. 5 ends. After the main process ends, a check process in which the power of the digital camera 10 is turned OFF and a state of the main switch 37 is checked at regular intervals is performed.

Figure 6:
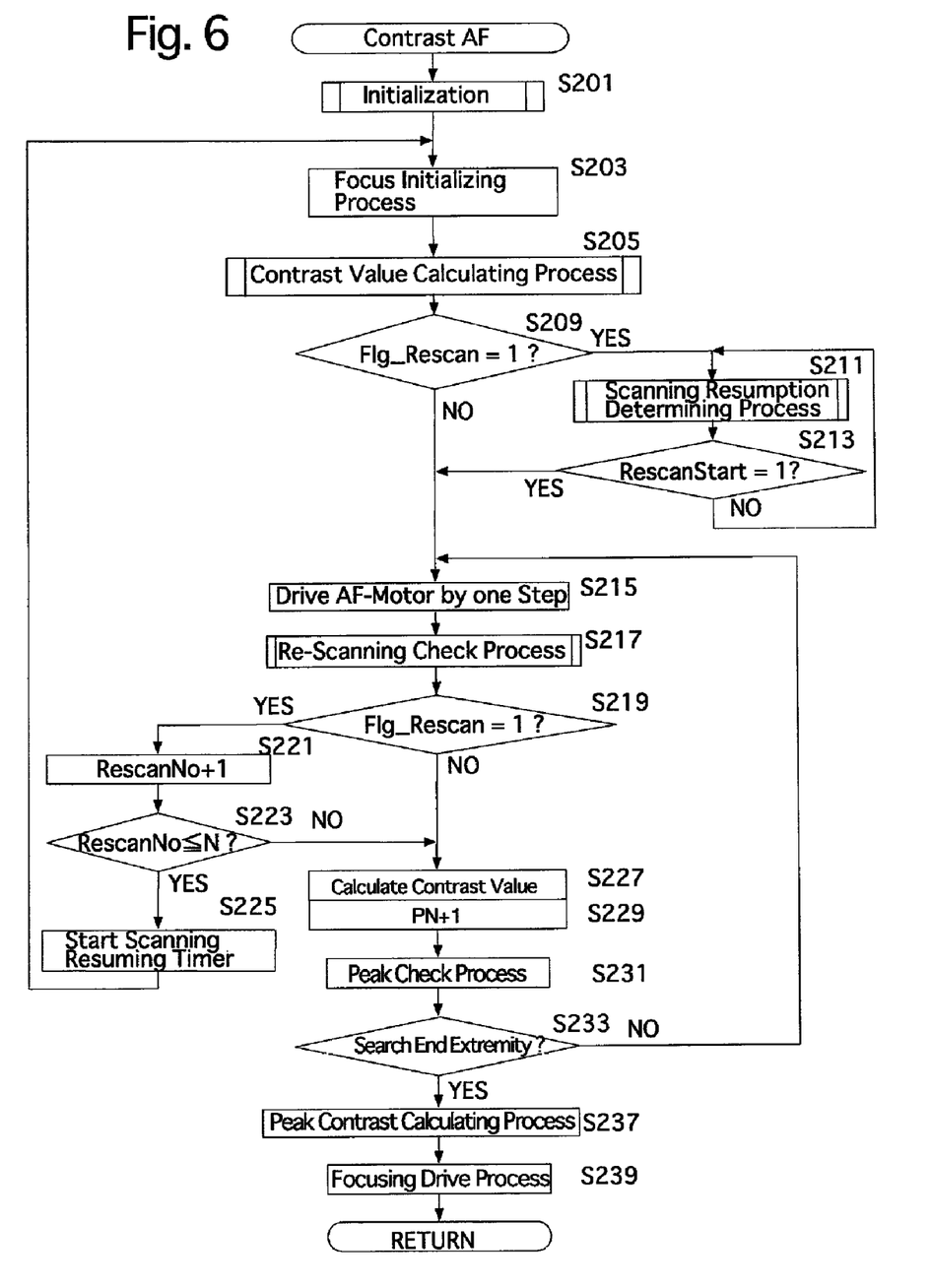
FIG. 6 is a flow chart showing the contrast AF process that is performed in the main process shown in FIG. 5.

The contrast AF process performed at step S123 will be hereinafter discussed in detail with reference to the flow chart shown in FIG. 6. In the contrast AF process, the aforementioned searching operation (scanning operation/AF scanning operation) is performed. In this operation, the focusing lens group L2 is moved to the search start extremity (closest focus position/near extremity) thereof, and an image capturing operation is sequentially performed by the CCD image sensor 11 while the focusing lens group L2 is being driven stepwise to determine contrast values at consecutive positions of the focusing lens group L2 based on image data of the object image within the AF frame 53. Thereafter, the following fundamental operations are performed: a peak contrast is determined from among the contrast values thus determined, and the focusing lens group L2 is moved to a position at which this peak contrast is obtained on the presumption that this position corresponds to an in-focus position.

In the contrast AF process, firstly various variables, etc., are initialized (step S201). For instance, each status (flag) is cleared (i.e., set to 0), contrast values are cleared, a lens-position pulse number PN is initialized (PN=0), the maximum contrast value is set to 0, the minimum contrast value is set to FFFFFFFF, a re-scanning flag (Flg_ReScan) is cleared, and a re-scanning number (RescanNO) is cleared.

Variables and flags are defined as follows.

Contrast values are those actually obtained from pixels in each focus detection area. Given that the lens-position pulse number PN is 0 when the focusing lens group L2 is positioned at the closest focus position that serves as the initial position of the focusing lens group L2, the lens-position pulse number PN is a variable which is incremented and decremented by one every time one lens-position pulse is output (every time the focusing lens group L2 is driven by a predetermined amount of movement) when the AF drive circuit 27 is driven in directions to move the focusing lens group L2 toward the infinite focus position and the closest focus position, respectively.

The re-scanning flag is a flag for identifying whether or not the current scanning operation (searching operation) has resumed after being suspended. Specifically, the re-scanning flag "1" indicates that the current scanning operation has resumed after being suspended and the re-scanning flag "0" indicates that the current scanning operation has not resumed after being suspended.

The re-scanning number is a variable which indicates how many times the re-scanning operation has been performed.

Subsequently, a focus initializing process is performed (step S203). In the focus initializing process, the focusing lens group L2 is moved to the search start extremity thereof.

Subsequently, image data at the search start extremity of the focusing lens group L2 is obtained and a contrast value calculating process is performed (step S205). Namely, based on the image data input from the CCD image sensor 11, the contrast value P[0] at the initial position of the focusing lens group L2 is calculated, and the maximum contrast value and the minimum contrast value are updated.

It is determined at step S209 whether or not the re-scanning flag is "1". If the re-scanning flag is "0" (if NO at step S209), i.e., if the scanning operation is performed for the first time, control proceeds to step S215 at which the focusing lens group L2 is driven toward the infinite focus position thereof by one step via the AF drive circuit 27. If the re-scanning flag is "1" (if YES at step S209), a scanning resumption determining process is performed since the scanning operation is currently suspended in the middle of the operation thereof (step S211) and it is determined whether or not a re-scanning start flag (RescanStart) is "1" (step S213). If the re-scanning start flag is not "1" (if NO at step S213), control returns to step S211 to perform the scanning resumption determining process. If the re-scanning start flag is "1" (if YES at step S213), control proceeds to step S215.

At step S215 the focusing lens group L2 is driven toward the infinite focus position thereof by one step, and subsequently a re-scanning check process (see FIG. 7) is performed (step S217). In the re-scanning check process, it is determined whether or not both an output Vx and an output Vy of the anti-shake driving circuit 31 are equal to or below a level responsive to the zoom position (currently-set focal length) (step S301). If both the output Vx and the output Vy are equal to or below the level (if YES at step S301), the re-scanning flag is set to "0" (step S303) and control returns (proceeds to step S219). If at least one of the output Vx and the output Vy is not equal to or below the level (if NO at step S301), the re-scanning flag is set to "1" (step S305) and control returns (proceeds to step S219).

Figure 7:
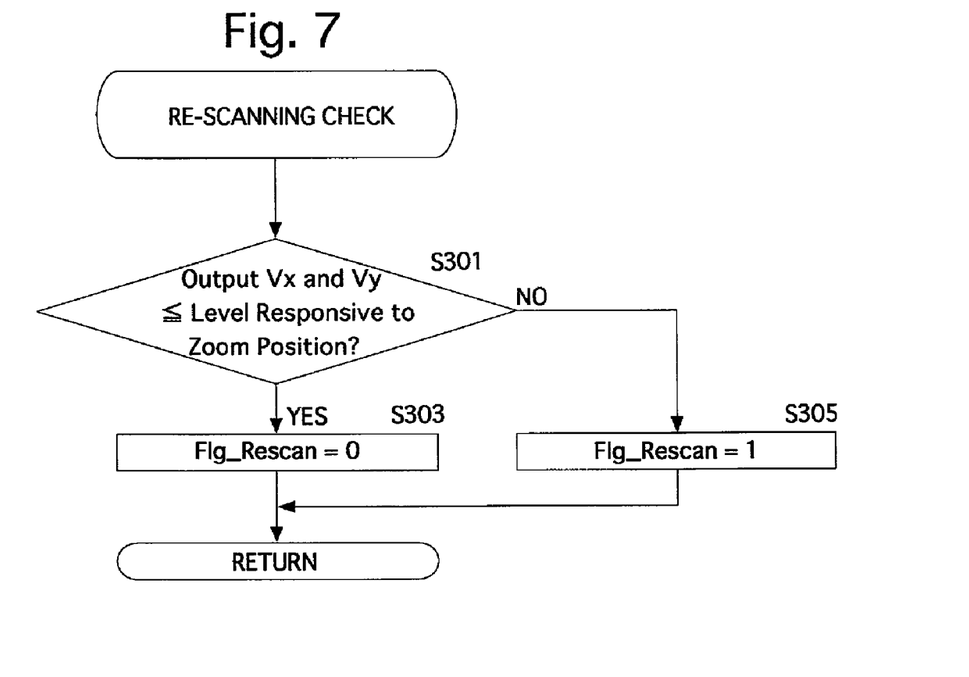
FIG. 7 is a flow chart showing a re-scanning check process performed in the contrast AF process shown in FIG. 6.

The aforementioned level responsive to the zoom position is predetermined to become large and small as the current focal length becomes short and long, respectively. This is because the effects of camera shake increase as the focal length increases. Note that the controller 25 can read and select the aforementioned level from, e.g., a focal-length level conversion table stored in the ROM 25a provided in the controller 25.

Upon completion of the re-scanning check process, it is determined whether or not the re-scanning start flag is "1" (step S219). If the re-scanning start flag is not "1" (if NO at step S219), a contrast value P[PN] is calculated in accordance with image data input from the CCD image sensor 11 (step S227), and the lens-position pulse number PN is incremented by one (step S229). Subsequently, a peak check process is performed which determines whether or not the contrast value P[PN] calculated at step S229 is a peak contrast which satisfies preset conditions (step S231). Thereafter, it is determined whether or not the focusing lens group L2 is positioned at the search end extremity thereof (step S233). If the focusing lens group L2 is positioned at the search end extremity thereof (if YES at step S233), a real peak contrast and the position at which this real peak contrast is obtained are calculated (by linear approximation) in accordance with the contrast values obtained at positions either side of the focusing lens group L2 at which a peak contrast has been obtained is included (step S237), and a focusing drive process in which the focusing lens group L2 is moved to the position thereof thus calculated (step S239). Upon completion of this focusing drive process, control returns.

If the re-scanning flag is set to "1" at step S305 in the re-scanning check process shown in FIG. 7, it is determined at step S219 that the re-scanning start flag is "1", so that control proceeds from step S219 to step S221. At step S221, the re-scanning number is incremented by one. Subsequently, it is determined whether or not the re-scanning number is equal to or smaller than a predetermined number N (step S223). If the re-scanning number is not equal to or smaller than the predetermined number N (if NO at step S223), control returns to step S227 so that the AF scan process continues. If the re-scanning number is equal to or smaller than the predetermined number N (if YES at step S223), a scanning resuming timer is started (step S225) and control returns to the focus initializing process at step S203.

The reason why the condition that the re-scanning number is not equal to or smaller than the predetermined number N is adopted as a condition for resumption of the AF scan process is that there is a high possibility of the main object image 55 still remaining within the AF frame 53 because only a short period of time elapses since detection of camera shake if the re-scanning number is not equal to or smaller than the predetermined number N, whereas, if the re-scanning number is greater than the predetermined number N, this means that camera shake lasts for a long period of time, so that there is a high possibility of the main object image 55 deviating from the AF frame 53.

Upon control returning to step S203 after the commencement of the scanning resuming timer at step S225, the focusing lens group L2 is moved back to the search start extremity thereof, the contrast value calculating process is performed (step S205), and control enters a scanning resumption determining process at step S211 since it is determined at step S209 that the re-scanning start flag is "1" (YES at step S209). The scanning resumption determining process will be hereinafter discussed in detail with reference to the flow chart shown in FIG. 8.

Figure 8:
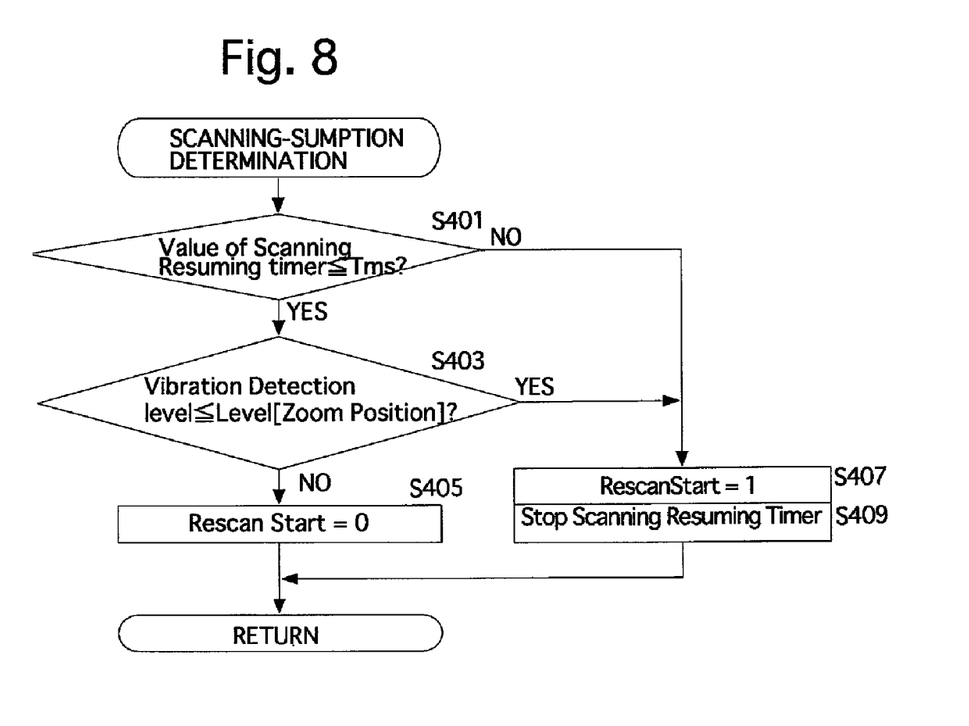
FIG. 8 is a flow chart showing a scanning resumption determining process.

In the scanning resumption determining process, firstly it is determined whether or not the value of the scanning resuming timer started at step S225 is equal to or smaller than a predetermined elapsed time Tms (step S401). If the value of the scanning resuming timer is equal to or smaller than the predetermined elapsed time Tms (if YES at step S401), it is determined whether or not both the output Vx and the output Vy of the anti-shake driving circuit 31 are equal to or below a level responsive to the zoom position (currently-set focal length) (step S403). If at least one of the output Vx and the output Vy is equal to or below the level (if NO at step S403), the re-scanning flag is set to "0" (step S405) and control returns (proceeds to step S213).

If the value of the scanning resuming timer is greater than the predetermined elapsed time Tms (if NO at step S401), or if both the output Vx and the output Vy of the anti-shake driving circuit 31 are equal to or below the level responsive to the zoom position (currently-set focal length) (if YES at step S403) even if the value of the scanning resuming timer is greater than the predetermined elapsed time Tms (if YES at step S401), the re-scanning flag is set to "1" (step S407), the scanning resuming timer is stopped (step S409) and control returns (proceeds to step S213).

According to the above described scanning resumption determining process, a main object image can be brought into focus precisely without delay after camera shake abates because the AF scan process resumes when a predetermined period of time elapses or when camera shake abates, whichever occurs earlier.

It can be determined whether or not the AF scan process is either suspended or terminated upon detection of vibrations (camera shake) in accordance with the scanning range determined at the completion of the AF scanning operation. For instance, it is possible not to move the focusing lens group L2 to the scan start extremity (search start extremity) even if the driving operation of the focusing lens group L2 is terminated (suspended) in the case where the AF scanning operation has been performed over at least two thirds of the entire scanning range or the case where contrast decreases after increasing by a predetermined amount when contrast increases. In this case, contrast data obtained until just before the focusing lens group L2 is stopped is stored, and contrast data is obtained at this stop position and the AF scanning operation resumes when the AF scanning operation is made to resume. This configuration makes it possible to decrease the possibility of a main object becoming out of focus or an object other than a main object being brought into focus in error and to reduce time necessary to achieve focus.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera having an image stabilizer, comprising:
   a focus adjusting system which captures images at different positions along an optical axis of a focusing lens group of a photographing optical system via an image pickup device while performing a searching operation in which said focusing lens group is moved along the optical axis thereof to detect an in-focus position of said focusing lens group based on contrasts of said captured images;
   a vibration detector for detecting camera shake;
   a shake-reduction driving device which is driven in a manner to prevent an object image which is formed on said image pickup device via said photographing optical system from shaking relative to said image pickup device when said vibration detector detects said camera shake; and
   a controller which controls said focus adjusting system so as to one of suspend and terminate said searching operation one of when said vibration detector detects a larger amount of said camera shake than a predetermined magnitude during said searching operation and when said camera shake lasts for more than a predetermined period of time during said searching operation.

2. The camera according to claim 1, wherein said controller controls said focusing adjusting system so as to move said focusing lens group back to said search start extremity when said controller makes said focus adjusting system terminate said searching operation.

3. The camera according to claim 1, wherein, upon said controller controlling said focusing adjusting system so as to suspend said searching operation, said controller resumes said searching operation immediately after said vibration detector detects that a magnitude of said camera shake has become smaller than that at said suspension of said searching operation, and wherein, when said controller controls said focusing adjusting system so as to terminate said searching operation, said controller resets and restarts said searching operation immediately after said vibration detector detects that said magnitude of said camera shake is smaller than that at said termination of said searching operation.

4. The camera according to claim 1, wherein, upon said controller controlling said focusing adjusting system so as to suspend said searching operation, said controller resumes said searching operation immediately after said vibration detector detects that said camera shake abates, and wherein, when said controller controls said focusing adjusting system so as to terminate said searching operation, said controller resets and restarts said searching operation immediately after said vibration detector detects that said camera shake abates.

5. The camera according to claim 1, wherein, upon said controller controlling said focusing adjusting system so as to suspend said searching operation, said controller resumes said searching operation immediately after a lapse of a predetermined period of time, and wherein, when said controller controls said focusing adjusting system so as to terminate said searching operation, said controller resets and restarts said searching operation immediately after said lapse of said predetermined period of time.

6. The camera according to claim 1, wherein, upon said controller controlling said focusing adjusting system so as to suspend said searching operation, said controller resumes said searching operation one of when said vibration detector detects that one of said camera shake abates and a magnitude of said camera shake becomes smaller than a predetermined magnitude at said suspension of said searching operation, and when a predetermined period of time elapses, whichever occurs earlier, and wherein, upon said controller controlling said focusing adjusting system so as to terminate said searching operation, said controller resets and restarts said searching operation one of when said vibration detector detects that one of said camera shake abates and that a magnitude of said camera shake becomes smaller than said predetermined magnitude at said termination of said searching operation, and when said predetermined period of time elapses, whichever occurs earlier.

7. The camera according to claim 1, wherein said controller prohibits said focusing adjusting system from suspending said searching operation regardless of said camera shake after restarting said searching operation subsequent to said suspension of said searching operation, and wherein said controller prohibits said focusing adjusting system from terminating said searching operation regardless of said camera shake after resetting and restarting said searching operation subsequent to said termination of said searching operation.

8. The camera according to claim 1, wherein said controller limits the number of executions of said suspension of said searching operation to a predetermined number, wherein said controller prohibits said focusing adjusting system from suspending said searching operation regardless of said camera shake after restarting said searching operation subsequent to said suspension of said searching operation, and wherein said controller prohibits said focusing adjusting system from terminating said searching operation regardless of said camera shake after resetting and restarting said searching operation subsequent to said termination of said searching operation.

9. The camera according to claim 3, wherein said magnitude of said camera shake at each of said suspension of said searching operation and said termination of said searching operation is one of equal to and greater than a predetermined magnitude determined in accordance with a current focal length of said photographing optical system.

10. The camera according to claim 9, wherein said magnitude of said camera shake at each of said suspension of said searching operation and said termination of said searching operation is set to be smaller as a focal length of said photographing optical system increases.

11. The camera according to claim 1, wherein said controller prohibits said focusing adjusting system from either suspending or terminating said searching operation regardless of said camera shake if said scanning operation is performed over at least a predetermined scanning range.

12. The camera according to claim 1, wherein said camera is a digital camera, and wherein said shake-reduction driving device moves said image pickup device in directions orthogonal to an optical axis (O) to prevent said object image from shaking relative to said image pickup device.

13. The camera according to claim 1, further comprising a switch for turning ON and OFF said shake-reduction driving device, wherein said controller activates said vibration detector and said shake-reduction driving device regardless of an ON/OFF state of said switch when said focus adjusting system starts said searching operation.

14. The camera according to claim 1, wherein said vibration detector comprises two angular velocity sensors.

* * * * *